Dec. 7, 1954  J. M. SCOTT ET AL  2,696,284
CONVEYER TRAFFIC CONTROL
Filed May 25, 1949  2 Sheets-Sheet 1

INVENTORS
JAMES M. SCOTT
TOR DANELIUS
BY
George H. Mortimer
ATTORNEY

Dec. 7, 1954  J. M. SCOTT ET AL  2,696,284
CONVEYER TRAFFIC CONTROL
Filed May 25, 1949  2 Sheets-Sheet 2
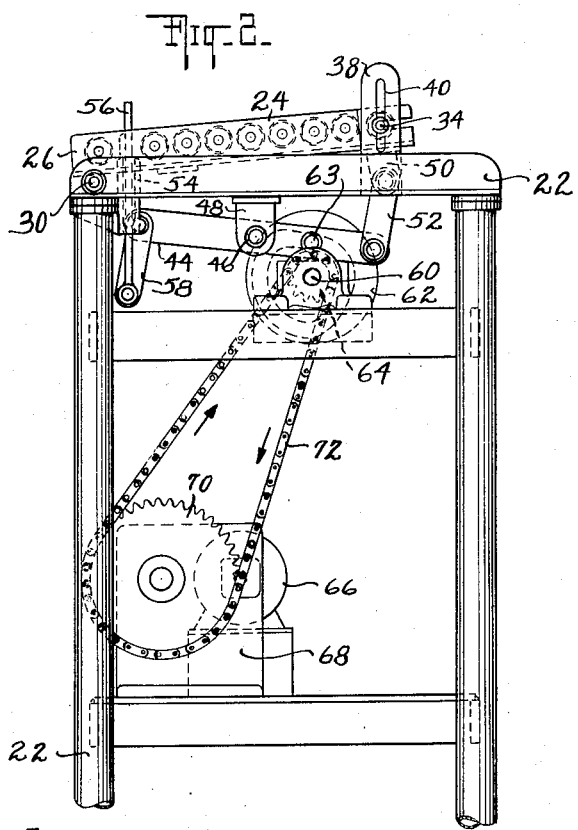
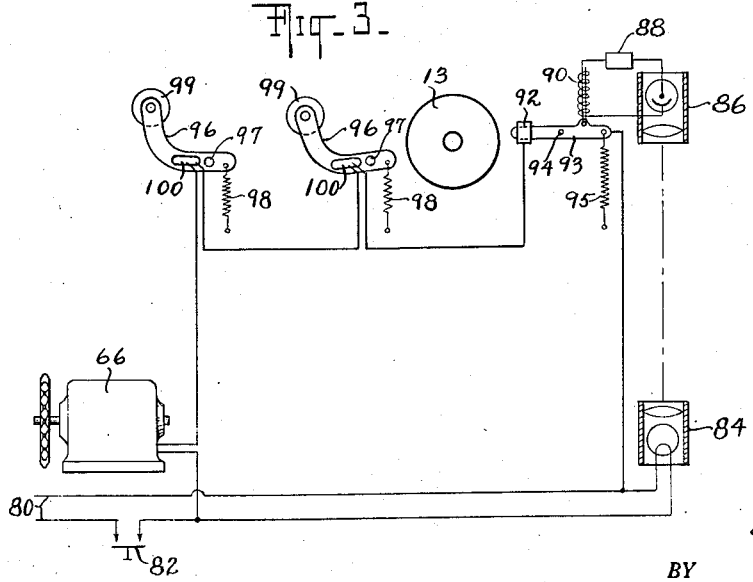
INVENTORS
JAMES M. SCOTT
TOR DANELIUS
BY
George H. Mortimer
ATTORNEY

United States Patent Office 2,696,284
Patented Dec. 7, 1954

2,696,284

CONVEYER TRAFFIC CONTROL

James M. Scott, Roselle, and Tor Danelius, Rutherford, N. J., assignors to Colgate-Palmolive Company, Jersey City, N. J., a corporation of Delaware Application May 25, 1949, Serial No. 95,282

5 Claims. (Cl. 193—35)

The present invention relates to a traffic control mechanism for conveyors and more particularly to a device for controlling the flow of articles from a branch conveyor onto a main conveyor without causing collisions at the junction.

Many industrial establishments have found the use of conveyors, particularly roller conveyors down which articles such as shipping containers or cases move by gravity, to be an economical way of transporting such articles from one place in the establishment to another. Where such cases are fed from several locations in the establishment to a central point it frequently happens that one or more branch lines feed into a main line. At the juncture of two such lines over which the articles travel without control it frequently happens that articles arrive at the junction from both lines at the same time and would become jammed in the throat of the single passage beyond the junction unless a workman prevented a collision. The present invention provides a means for automatically controlling the flow of articles from the branch line into the main line so as to prevent such collisions and jamming.

Other objects and advantages of the present invention will become obvious from the following detailed description of the best embodiment thereof which is at present known, taken in conjunction with the drawings, in which:

Fig. 2 shows in a front elevation, an escapement mechanism forming a part of the traffic control device; and Fig. 3 is a schematic wiring diagram for the control system.

Figure 1:
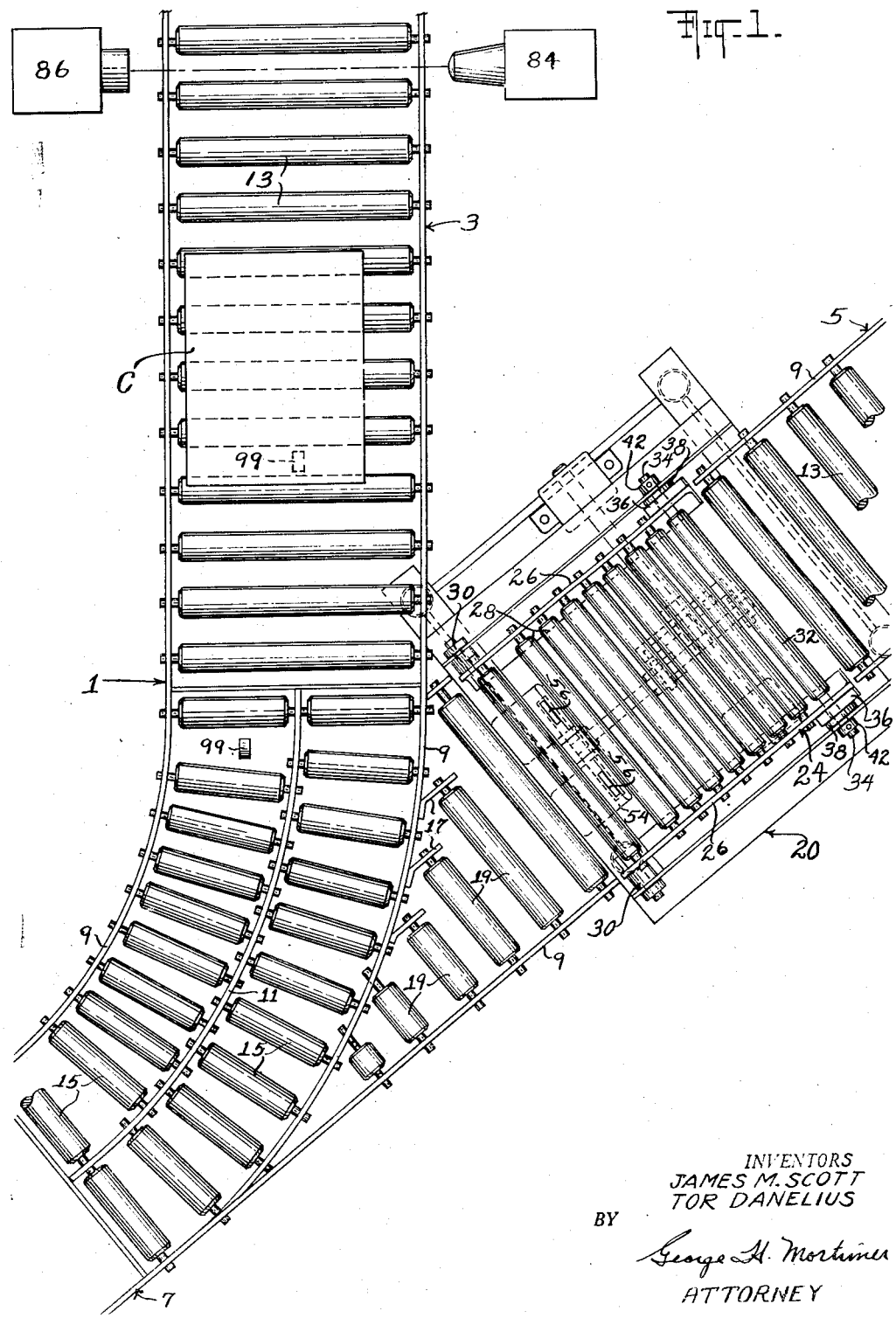
Fig. 1 represents a fragmentary plan view of the junction of a pair of roller conveyors.

Referring now more particularly to Fig. 1 of the drawing, the conveyor junction or Y represented by numeral 1 comprises a main roller conveyor 3 and a branch roller conveyor 5 which comes together in the throat of the Y and continue as a single roller conveyor 7. Each of the conveyors 3, 5 and 7 comprises side rails 9 and at the bend in the main conveyor 3 a central rail 11 is also provided. Rollers 13 are mounted within the side rails 9 along the straight parts of the conveyor. In the bend shorter rollers 15 are similarly mounted between the outside rails 9 and the central rail 11. Where the branch conveyor 5 connects with the main conveyor 3 a plurality of brackets 17 are secured to the adjacent side rail 9 of conveyor 3 for supporting the inner ends of a plurality of stepped rollers 19. It will be understood that the conveyors are provided with the necessary guard rails to hold the packages or cases C on the rollers and to guide these cases around bends. The foregoing parts are conventional in roller conveyors and the particular details thereof form no part of the present invention.

In the traffic control of the present invention, cases C on the main conveyor 3 are given the right of way by a control device 20 which forms a part of the branch conveyor 5. This control device comprises a frame 22 which supports the various parts of the mechanism. A hinged or pivoted conveyor section 24, which comprises side rails 26 and rollers 28 mounted therein, is pivoted to frame 22 at 30 on the downstream end thereof. At the free end of conveyor section 24 a roller 32 is provided with a shaft 34 which extends through bifurcated bearing blocks 36, one of which is secured to each of the side rails 26 and which are similarly slotted, through guides 38 which are provided with vertical slots 40 for the shaft and finally through collars 42 which are suitably secured to the shaft.

A lever 44 is pivotably secured at 46 to a stud 48 which is fastened to the frame 22 beneath the hinged section 24. A stud 50 which is secured to the free end of the hinged section 24, is connected by a link 52 with one end of lever 44 as seen in Fig. 2. Vertical guides 54 are secured to frame 22 near the axis of pivots 30 in which stop bars 56 are slidably mounted. Bars 56 are connected by link 58 with the other end of lever 44. Adjacent to lever 44 and transversely arranged with respect thereto is a shaft 60 suitably journaled in the frame 22 which carries a cam 62 and a sprocket 64. The cam 62 has a groove or race in which a roller 63 on lever 44 is adapted to ride to impart oscillating movement to the lever as the cam rotates.

Mounted in the framework 22 is an electric motor 66 which is operatively connected to a speed reduction gearing mechanism 68 which drives at slow speed a sprocket 70. A chain 72 connects sprocket 70 with sprocket 64 whereby the rotation of the motor 66 is imparted to shaft 60 at a predetermined desirable reduced rate of speed. Power is supplied to motor 66 from a suitable power source 80 through a circuit which includes a manual switch 82 for turning the traffic control device on and off. A light source 84 and a photoelectric cell 86 are mounted on opposite sides of the conveyor 3 at the beginning of a control zone adjacent to the junction of the two conveyors in such a position that a case C passing down the conveyor 3 interrupts the beam of light normally passing from the light source 84 into the electric eye 86. An amplifier 88 and a solenoid 90 are connected in the circuit of the photoelectric cell 86 as seen in Fig. 3. The solenoid is connected with switch 92 which comprises a bar pivoted at 94 and having spring 95 biasing the bar 93 to open position.

Also located in the control zone of conveyor 3 are two mechanical switches comprising levers 96 pivoted to the conveyor framework at 97 having springs 98 normally biasing a roller 99 into raised position above the plane of the rollers 13 or 15 as the case may be. Secured to the lever 96 is a mercury switch 100 which is so arranged that the mercury connects the electrodes when the lever 96 is in raised position but breaks the electrical connection when the roller 99 is depressed to the plane of the rollers.

Switch 92 and the two mercury switches 100 are connected in series between the motor 66 and one of the leads from power source 80, or they may be part of an auxiliary circuit which controls a switch in one of the leads from the power source. The other lead from source 80 goes directly to motor 66.

In the operation of the traffic control mechanism which has been described, motor 66 normally operates so long as a case C is not within the control zone which begins at the light beam passing from light source 84 into the electric eye 86 and which terminates with the lower roller 99. The motor rotates cam 62 in the manner described and imparts periodic rocking movement to lever 44. Beginning with the parts in the position shown in Fig. 2, counter-clockwise movement of lever 44 raises the free end of conveyor section 24 and simultaneously pulls the stop bars 56 below the plane of the rollers 28 and 32. The first roller 32 travels in a vertical plane because the shaft 34 rides in the vertical slots 40 of the guides 38. This is of advantage in preventing damage to a shipping case or the like if it should arrive at the control device while the hinged section is in raised position. If the roller 32 were fixed to the hinged section it would describe an arcuate rather than vertical path and tend to dig into a case resting against it. The movement of the lever 44 to the starting position, which occurs when the roller 63 reaches the low part of 62, lowers the hinged section until the rollers 28 and 32 again lie in the plane of the rollers 13 of conveyor 9 and thus permits a shipping case to pass from the conveyor 9 onto the hinged section. Meantime the stop bars 56 have been raised above the plane of the rollers 28 and prevent a case from passing into the junction of the two conveyors. If rotation of the motor 66 continues the hinged section will again be raised and the stop bars 56 lowered to free the package to move into the junction and it will be given a start by reason of the increased angle of slope of the hinged section when the stop bars 56 are moved to their inactive position.

Whenever a case C, however, enters the control zone of conveyor 3 and interrupts the light beam, solenoid 90 which normally overpowers the force of spring 95 and holds the switch 92 in closed position, becomes deenergized and permits spring 95 to open switch 92 and thereby open the circuit to motor 66 which then comes to rest. The motor 66 does not commence to run again until the case C has cleared the control zone by passing over both rollers 99 in succession. These rollers are so spaced with reference to the beam of light and each other that the circuit to the motor is kept open as long as cases remain in the control zone. Regardless of the position of the hinged section 24 when motor 66 stops running, the flow of cases from conveyor 5 is prevented either by the stop bars 56 or the roller 32. The hinged section 24 preferably has a length from the stops 56 to the roller 32 slightly less than the dimension of the case from front to back as it travels down the conveyor. In this way the control device acts as an escapement mechanism for feeding cases from conveyor 5 one at a time into the junction with conveyor 3 when the way is clear, but always gives cases in the control zone of the main line the right of way.

Although the present invention has been described and illustrated with reference to the best embodiment now known, modifications and variations of the mechanism and control may be made without departing from the spirit and scope of the invention as defined in the following claims.

What is claimed is:

1. A roller conveyor comprising a pivoted conveyor section having a plurality of rollers extending in a direction transverse to that of said pivoted section, at least the roller at the free end of said pivoted section being capable of rotating in either direction about its axis, a vertical guide for the roller at the free end of said pivoted section, a movable stop located adjacent to the pivoted end of said section, a vertical guide for said stop, and means for raising and lowering the free end of said pivoted section and said stop alternately.

2. In a roller conveyor system including a main roller conveyor and a branch roller conveyor feeding into said main conveyor, the improvements which comprise a pivoted conveyor section in said branch conveyor adjacent to said main conveyor, a plurality of rollers carried by said pivoted section extending in a direction transverse to that of said pivoted section, at least the roller at the free end of said pivoted section being free to rotate in both directions about its axis, a vertical guide for the roller at the free end of said pivoted section, a movable stop located adjacent to the pivoted end of said section, a vertical guide for said stop, a control zone in said main conveyor, and means in said control zone operatively connected with said stop and said pivoted section for raising and lowering said stop and the free end of said pivoted section alternately.

3. A roller conveyor system as set forth in claim 2 in which said means in said control zone for raising and lowering said stop and the free end of said pivoted section alternately comprises a light source mounted on one side of said main conveyor at the beginning of the control zone for projecting a beam of light across only said main conveyor at a position such that the beam is interrupted by articles on said conveyor and a photoelectric cell mounted on the other side of said main conveyor for receiving said beam of light.

4. In a conveyor junction comprising a first roller conveyor, a second roller conveyor joining said first conveyor, and a third roller conveyor common to said first and second conveyors the improvements which comprise an escapement comprising a pivoted conveyor section in said second conveyor adjacent to said junction, a plurality of rollers carried by said pivoted section extending in a direction transverse to that of said pivoted section, at least the roller at the free end of said pivoted section being adapted to rotate freely in either direction about its axis, a vertical guide for the roller at the free end of said pivoted section, a movable stop located at the pivoted end of said section, a vertical guide for said stop, a control zone in said first conveyor adjacent to said junction, and means in said control zone operatively connected with said stop and said pivoted section and actuated by the passage of a case through said control zone for raising and lowering said stop and the free end of said pivoted section alternately.

5. In a conveyor junction comprising a main roller conveyor and a branch roller conveyor the improvements which comprise a pivoted conveyor section in said branch conveyor near said junction, a plurality of rollers on said pivoted section disposed transverse to the pivoted section, at least the roller at the free end of said pivoted section being adapted to rotate freely in both directions about its axis, a vertical guide for the roller at the free end of said pivoted section, said pivoted section being movable relative to said branch conveyor to a position to prevent passage of a case from the branch conveyor onto said pivoted section, a movable stop located at the pivoted end of said pivoted section for preventing passage of a case from said pivoted section into said junction until said pivoted section has moved into position to prevent advancement of a succeeding case onto said pivoted section, a vertical guide for said stop, a traffic control zone in said main conveyor adjacent to the junction of the two conveyors, and means in said control zone operatively connected with said stop and said pivoted section for raising and lowering said stop and the free end of said pivoted section alternately to prevent cases on said branch conveyor from passing said pivoted section and onto said main conveyor when a case is in said control zone.

References Cited in the file of this patent

UNITED STATES PATENTS

| Number | Name | Date |
|---|---|---|
| Re. 18,262 | Olson | Nov. 24, 1931 |
| 1,021,876 | Lister | Apr. 2, 1912 |
| 1,560,830 | Langsdorf | Nov. 10, 1925 |
| 1,583,005 | Parker | May 4, 1926 |
| 1,583,093 | Parker | May 4, 1926 |
| 1,800,898 | Nelson | Apr. 14, 1931 |
| 1,820,674 | Olson | Aug. 25, 1931 |
| 2,304,447 | Feusier | Dec. 8, 1942 |
| 2,372,789 | Mitchell | Apr. 3, 1945 |